United States Patent
Hinman et al.

(10) Patent No.: US 9,780,892 B2
(45) Date of Patent: Oct. 3, 2017

(54) SYSTEM AND METHOD FOR ALIGNING A RADIO USING AN AUTOMATED AUDIO GUIDE

(71) Applicant: Mimosa Networks, Inc., Santa Clara, CA (US)

(72) Inventors: Brian L. Hinman, Los Gatos, CA (US); Jaime Fink, San Francisco, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 0 days.

(21) Appl. No.: 14/639,976

(22) Filed: Mar. 5, 2015

(65) Prior Publication Data

US 2015/0256275 A1  Sep. 10, 2015

Related U.S. Application Data

(60) Provisional application No. 61/948,474, filed on Mar. 5, 2014.

(51) Int. Cl.
| | | |
|---|---|---|
| H04B 17/23 | (2015.01) | |
| H04W 4/00 | (2009.01) | |
| H04B 17/318 | (2015.01) | |

(52) U.S. Cl.
CPC .......... *H04B 17/23* (2015.01); *H04B 17/318* (2015.01); *H04W 4/008* (2013.01)

(58) Field of Classification Search
CPC ...... H04B 17/23; H04B 17/318; H04B 17/27; H04W 4/008
USPC .......................................... 455/41.2
See application file for complete search history.

(56) References Cited

U.S. PATENT DOCUMENTS

| | | | |
|---|---|---|---|
| 2,735,993 | A | 2/1956 | Humphrey |
| 3,182,129 | A | 5/1965 | Clark et al. |
| D227,476 | S | 6/1973 | Kennedy |
| 4,188,633 | A | 2/1980 | Frazita |
| 4,402,566 | A | 9/1983 | Powell et al. |
| D273,111 | S | 3/1984 | Hirata et al. |

(Continued)

FOREIGN PATENT DOCUMENTS

| | | |
|---|---|---|
| CN | 303453662 S | 11/2015 |
| CN | 105191204 | 12/2015 |

(Continued)

OTHER PUBLICATIONS

International Search Report and Written Opinion of the International Search Authority mailed Nov. 26, 2013 in Patent Cooperation Treaty Application No. PCT/US2013/047406, filed Jun. 24, 2013.

(Continued)

*Primary Examiner* — Edward Urban
*Assistant Examiner* — Ralph H Justus
(74) *Attorney, Agent, or Firm* — Carr & Ferrell LLP

(57) ABSTRACT

A method and system are provided. The method includes receiving a signal strength corresponding to a long range wireless link established between a first directional wireless radio and a second wireless radio, the signal strength varying over time as the first directional wireless radio is aligned with a second wireless radio by an installer, and producing a sound indicator indicative of the signal strength. The sound indicator varies over time as the first directional wireless radio is aligned with the second wireless radio.

20 Claims, 6 Drawing Sheets

(56) References Cited

U.S. PATENT DOCUMENTS

| | | | |
|---|---|---|---|
| 4,543,579 A | 9/1985 | Teshirogi | |
| 4,626,863 A | 12/1986 | Knop et al. | |
| 4,866,451 A | 9/1989 | Chen | |
| 4,893,288 A * | 1/1990 | Maier | G01S 3/40 342/359 |
| 4,903,033 A | 2/1990 | Tsao et al. | |
| 4,986,764 A | 1/1991 | Eaby et al. | |
| 5,015,195 A | 5/1991 | Piriz | |
| 5,226,837 A | 7/1993 | Cinibulk et al. | |
| 5,231,406 A | 7/1993 | Sreenivas | |
| D346,598 S | 5/1994 | McCay et al. | |
| D355,416 S | 2/1995 | McCay et al. | |
| 5,389,941 A | 2/1995 | Yu | |
| 5,491,833 A | 2/1996 | Hamabe | |
| 5,513,380 A | 4/1996 | Ivanov et al. | |
| D375,501 S | 11/1996 | Lee et al. | |
| 5,580,264 A | 12/1996 | Aoyama et al. | |
| 5,684,495 A | 11/1997 | Dyott et al. | |
| D389,575 S | 1/1998 | Grasfield et al. | |
| 5,724,666 A | 3/1998 | Dent | |
| 5,742,911 A | 4/1998 | Dumbrill et al. | |
| 5,746,611 A | 5/1998 | Brown et al. | |
| 6,014,372 A * | 1/2000 | Kent | H04B 7/2041 370/316 |
| 6,067,053 A | 5/2000 | Runyon et al. | |
| 6,137,449 A | 10/2000 | Kildal | |
| 6,140,962 A | 10/2000 | Groenenboom | |
| 6,176,739 B1 | 1/2001 | Denlinger et al. | |
| 6,216,266 B1 * | 4/2001 | Eastman | H04N 5/44513 348/570 |
| 6,304,762 B1 | 10/2001 | Myers et al. | |
| D455,735 S | 4/2002 | Winslow | |
| 6,421,538 B1 | 7/2002 | Byrne | |
| 6,716,063 B1 | 4/2004 | Bryant et al. | |
| 6,754,511 B1 | 6/2004 | Halford et al. | |
| 6,847,653 B1 | 1/2005 | Smiroldo | |
| D501,848 S | 2/2005 | Uehara et al. | |
| 6,877,277 B2 | 4/2005 | Kussel et al. | |
| 6,962,445 B2 | 11/2005 | Zimmel et al. | |
| 7,075,492 B1 | 7/2006 | Chen et al. | |
| D533,899 S | 12/2006 | Ohashi et al. | |
| 7,173,570 B1 | 2/2007 | Wensink et al. | |
| 7,193,562 B2 | 3/2007 | Shtrom et al. | |
| 7,212,163 B2 | 5/2007 | Huang et al. | |
| 7,245,265 B2 | 7/2007 | Kienzle et al. | |
| 7,253,783 B2 | 8/2007 | Chiang et al. | |
| 7,264,494 B2 | 9/2007 | Kennedy et al. | |
| 7,281,856 B2 | 10/2007 | Grzegorzewska et al. | |
| 7,292,198 B2 | 11/2007 | Shtrom et al. | |
| 7,306,485 B2 | 12/2007 | Masuzaki et al. | |
| 7,324,057 B2 | 1/2008 | Argaman et al. | |
| D566,698 S | 4/2008 | Choi et al. | |
| 7,362,236 B2 * | 4/2008 | Hoiness | H04Q 9/00 340/870.02 |
| 7,369,095 B2 | 5/2008 | Hirtzlin et al. | |
| 7,380,984 B2 | 6/2008 | Wuester | |
| 7,431,602 B2 | 10/2008 | Corona | |
| 7,498,996 B2 | 3/2009 | Shtrom et al. | |
| 7,507,105 B1 | 3/2009 | Peters et al. | |
| 7,542,717 B2 | 6/2009 | Green, Sr. et al. | |
| 7,581,976 B2 | 9/2009 | Liepold et al. | |
| 7,586,891 B1 * | 9/2009 | Masciulli | H04L 45/122 342/13 |
| 7,616,959 B2 | 11/2009 | Spenik et al. | |
| 7,675,473 B2 | 3/2010 | Kienzle et al. | |
| 7,726,997 B2 | 6/2010 | Kennedy et al. | |
| 7,778,226 B2 | 8/2010 | Rayzman et al. | |
| 7,857,523 B2 | 12/2010 | Masuzaki | |
| 7,929,914 B2 * | 4/2011 | Tegreene | H01Q 3/26 342/367 |
| RE42,522 E | 7/2011 | Zimmel et al. | |
| 8,009,646 B2 | 8/2011 | Lastinger et al. | |
| 8,069,465 B1 | 11/2011 | Bartholomay et al. | |
| 8,111,678 B2 | 2/2012 | Lastinger et al. | |
| 8,270,383 B2 | 9/2012 | Lastinger et al. | |
| 8,325,695 B2 | 12/2012 | Lastinger et al. | |
| D674,787 S | 1/2013 | Tsuda et al. | |
| 8,345,651 B2 | 1/2013 | Lastinger et al. | |
| 8,482,478 B2 | 7/2013 | Hartenstein | |
| 8,515,434 B1 | 8/2013 | Narendran et al. | |
| 8,515,495 B2 | 8/2013 | Shang et al. | |
| D694,740 S | 12/2013 | Apostolakis | |
| 8,777,660 B2 | 7/2014 | Chiarelli et al. | |
| 8,792,759 B2 | 7/2014 | Benton et al. | |
| 8,827,729 B2 | 9/2014 | Gunreben et al. | |
| 8,836,601 B2 | 9/2014 | Sanford et al. | |
| 8,870,069 B2 | 10/2014 | Bellows | |
| 8,935,122 B2 * | 1/2015 | Stisser | H01Q 1/125 342/173 |
| 9,001,689 B1 | 4/2015 | Hinman et al. | |
| 9,019,874 B2 | 4/2015 | Choudhury et al. | |
| 9,077,071 B2 | 7/2015 | Shtrom et al. | |
| 9,130,305 B2 | 9/2015 | Ramos et al. | |
| 9,161,387 B2 | 10/2015 | Fink et al. | |
| 9,179,336 B2 | 11/2015 | Fink et al. | |
| 9,191,081 B2 | 11/2015 | Hinman et al. | |
| D752,566 S | 3/2016 | Hinman et al. | |
| 9,295,103 B2 | 3/2016 | Fink et al. | |
| 9,362,629 B2 | 6/2016 | Hinman et al. | |
| 9,391,375 B1 | 7/2016 | Bales et al. | |
| 9,407,012 B2 | 8/2016 | Shtrom et al. | |
| 9,431,702 B2 | 8/2016 | Hartenstein | |
| 9,504,049 B2 | 11/2016 | Hinman et al. | |
| 9,531,114 B2 | 12/2016 | Ramos et al. | |
| 9,537,204 B2 | 1/2017 | Cheng et al. | |
| 2001/0033600 A1 | 10/2001 | Yang et al. | |
| 2002/0102948 A1 | 8/2002 | Stanwood et al. | |
| 2002/0159434 A1 | 10/2002 | Gosior et al. | |
| 2003/0013452 A1 | 1/2003 | Hunt et al. | |
| 2003/0027577 A1 | 2/2003 | Brown et al. | |
| 2003/0169763 A1 | 9/2003 | Choi et al. | |
| 2003/0222831 A1 | 12/2003 | Dunlap | |
| 2003/0224741 A1 | 12/2003 | Sugar et al. | |
| 2004/0002357 A1 | 1/2004 | Benveniste | |
| 2004/0029549 A1 | 2/2004 | Fikart | |
| 2004/0120277 A1 | 6/2004 | Holur et al. | |
| 2004/0196812 A1 | 10/2004 | Barber | |
| 2004/0196813 A1 | 10/2004 | Ofek et al. | |
| 2004/0240376 A1 | 12/2004 | Wang et al. | |
| 2004/0242274 A1 | 12/2004 | Corbett et al. | |
| 2005/0032479 A1 | 2/2005 | Miller et al. | |
| 2005/0058111 A1 | 3/2005 | Hung et al. | |
| 2005/0124294 A1 | 6/2005 | Wentink | |
| 2005/0143014 A1 | 6/2005 | Li et al. | |
| 2005/0195758 A1 | 9/2005 | Chitrapu | |
| 2005/0227625 A1 | 10/2005 | Diener | |
| 2005/0271056 A1 | 12/2005 | Kaneko | |
| 2006/0072518 A1 | 4/2006 | Pan et al. | |
| 2006/0132359 A1 | 6/2006 | Chang et al. | |
| 2006/0132602 A1 | 6/2006 | Muto et al. | |
| 2006/0172578 A1 | 8/2006 | Parsons | |
| 2006/0187952 A1 | 8/2006 | Kappes et al. | |
| 2007/0001910 A1 | 1/2007 | Yamanaka et al. | |
| 2007/0019664 A1 | 1/2007 | Benveniste | |
| 2007/0035463 A1 | 2/2007 | Hirabayashi | |
| 2007/0060158 A1 | 3/2007 | Medepalli et al. | |
| 2007/0132643 A1 | 6/2007 | Durham et al. | |
| 2007/0173199 A1 | 7/2007 | Sinha | |
| 2007/0173260 A1 | 7/2007 | Love et al. | |
| 2007/0210974 A1 | 9/2007 | Chiang | |
| 2007/0223701 A1 | 9/2007 | Emeott et al. | |
| 2007/0238482 A1 | 10/2007 | Rayzman et al. | |
| 2007/0255797 A1 | 11/2007 | Dunn et al. | |
| 2007/0268848 A1 | 11/2007 | Khandekar et al. | |
| 2008/0109051 A1 | 5/2008 | Splinter et al. | |
| 2008/0112380 A1 | 5/2008 | Fischer | |
| 2008/0192707 A1 | 8/2008 | Xhafa et al. | |
| 2008/0218418 A1 | 9/2008 | Gillette | |
| 2008/0242342 A1 | 10/2008 | Rofougaran | |
| 2009/0046673 A1 | 2/2009 | Kaidar | |
| 2009/0052362 A1 | 2/2009 | Meier et al. | |
| 2009/0075606 A1 | 3/2009 | Shtrom et al. | |
| 2009/0232026 A1 | 9/2009 | Lu | |

(56) References Cited

U.S. PATENT DOCUMENTS

| | | |
|---|---|---|
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0046650 A1 | 2/2010 | Jongren et al. |
| 2010/0067505 A1 | 3/2010 | Fein et al. |
| 2010/0085950 A1 | 4/2010 | Sekiya et al. |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0136978 A1 | 6/2010 | Cho et al. |
| 2010/0151877 A1 | 6/2010 | Lee et al. |
| 2010/0167719 A1 | 7/2010 | Sun |
| 2010/0171665 A1 | 7/2010 | Nogami |
| 2010/0171675 A1 | 7/2010 | Borja et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0238083 A1* | 9/2010 | Malasani ............... H01Q 1/125 343/765 |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0103309 A1 | 5/2011 | Wang et al. |
| 2011/0111715 A1* | 5/2011 | Buer ..................... H01Q 1/1257 455/226.2 |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0241969 A1 | 10/2011 | Zhang et al. |
| 2011/0243291 A1 | 10/2011 | McAllister et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0238201 A1 | 9/2012 | Du et al. |
| 2012/0263145 A1 | 10/2012 | Marinier et al. |
| 2012/0299789 A1 | 11/2012 | Orban et al. |
| 2012/0314634 A1 | 12/2012 | Sekhar |
| 2013/0005350 A1 | 1/2013 | Campos et al. |
| 2013/0023216 A1 | 1/2013 | Moscibroda et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li |
| 2013/0271319 A1* | 10/2013 | Trerise ................... H01Q 1/125 342/359 |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1* | 1/2014 | Balbien ................ H01Q 1/1257 455/269 |
| 2014/0051357 A1 | 2/2014 | Steer et al. |
| 2014/0098748 A1 | 4/2014 | Chan et al. |
| 2014/0145890 A1 | 5/2014 | Ramberg et al. |
| 2014/0185494 A1 | 7/2014 | Yang et al. |
| 2014/0198867 A1 | 7/2014 | Sturkovich et al. |
| 2014/0206322 A1 | 7/2014 | Dimou et al. |
| 2014/0225788 A1* | 8/2014 | Schulz .................. G06F 3/0482 343/702 |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0015435 A1* | 1/2015 | Shen ..................... H01Q 1/1257 342/351 |
| 2015/0215952 A1 | 7/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0149634 A1 | 5/2016 | Kalkunte et al. |
| 2016/0149635 A1 | 5/2016 | Hinman et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |

FOREIGN PATENT DOCUMENTS

| | | |
|---|---|---|
| EP | 1384285 B1 | 6/2007 |
| EP | 002640177 | 2/2015 |
| WO | WO2014137370 | 9/2014 |
| WO | WO2014138292 | 9/2014 |
| WO | WO2014193394 | 12/2014 |
| WO | WO2015112627 | 7/2015 |

OTHER PUBLICATIONS

International Search Report and Written Opinion of the International Search Authority mailed Aug. 9, 2013 in Patent Cooperation Treaty Application No. PCT/US2013/043436, filed May 30, 2013.

International Search Report and Written Opinion of the International Search Authority mailed Jul. 1, 2014 in Patent Cooperation Treaty Application No. PCT/US2014/020880, filed Mar. 5, 2014.

Notice of Allowance, Jul. 13, 2015, U.S. Appl. No. 14/183,445, filed Feb. 18, 2014.

Notice of Allowance, Jul. 15, 2015, U.S. Appl. No. 13/925,566, filed Jun. 24, 2013.

International Search Report and Written Opinion of the International Search Authority mailed Jun. 29, 2015 in Patent Cooperation Treaty Application No. PCT/US2015/012285, filed Jan. 21, 2015.

Hinman et al., Provisional U.S. Appl. No. 61/774,632, filed Mar. 7, 2013.

First Official Notification mailed Jun. 15, 2015 in Chinese Design Patent Application 201530058063.8, filed Mar. 11, 2015.

Notice of Allowance mailed Sep. 8, 2015 in Chinese Design Patent Application 201530058063.8, filed Mar. 11, 2015.

Non-Final Office Action, Apr. 26, 2016, U.S. Appl. No. 14/802,829, filed Jul. 17, 2015.

Notice of Allowance, Aug. 16, 2016, U.S. Appl. No. 14/802,829, filed Jul. 17, 2015.

Non-Final Office Action, Jan. 27, 2017, U.S. Appl. No. 14/198,473, filed Mar. 5, 2014.

Non-Final Office Action, Feb. 17, 2017, U.S. Appl. No. 14/833,038, filed Aug. 21, 2015.

Non-Final Office Action, Feb. 23, 2017, U.S. Appl. No. 15/246,094, filed Aug. 24, 2016.

Notice of Allowance, Mar. 1, 2017, U.S. Appl. No. 14/741,423, filed Jun. 16, 2015.

Non-Final Office Action, Mar. 22, 2017, U.S. Appl. No. 15/224,412, filed Jul. 29, 2016.

Non-Final Office Action, dated Mar. 30, 2017, U.S. Appl. No. 15/246,118, filed Aug. 24, 2016.

(56) References Cited

OTHER PUBLICATIONS

Non-Final Office Action, dated Mar. 31, 2017, U.S. Appl. No. 14/316,537, filed Jun. 26, 2014.
Final Office Action, dated Apr. 13, 2017, U.S. Appl. No. 15/139,225, filed Apr. 26, 2016.
Final Office Action, dated May 11, 2017, U.S. Appl. No. 14/183,375, filed Feb. 18, 2014.
Non-Final Office Action, dated Jun. 7, 2017, U.S. Appl. No. 14/802,816, filed Jul. 17, 2015.
Weisstein, Eric "Electric Polarization", Retrieved from the Internet [retrieved Mar. 23, 2007] available at <http://scienceworld.wolfram.com/physics/ElectricPolarization.html>, 1 page.
Liu, Lingjia et al., "Downlink MIMO in LTE-Advanced: SU-MIMO vs. MU-MIMO," IEEE Communications Magazine, Feb. 2012, pp. 140-147.
International Search Report and "Written Opinion of the International Searching Authority," Patent Cooperation Treaty Application No. PCT/US2017/012884, dated Apr. 6, 2017, 9 pages.

* cited by examiner

US 9,780,892 B2

SYSTEM AND METHOD FOR ALIGNING A RADIO USING AN AUTOMATED AUDIO GUIDE

CROSS REFERENCE TO RELATED APPLICATIONS

This application claims the priority benefit of U.S. Provisional Application Ser. No. 61/948,474, filed on Mar. 5, 2014, which is hereby incorporated by reference herein in its entirety including all references cited therein.

FIELD OF THE INVENTION

The present invention relates to radio installation systems and methods. In particular, the present system and method enables an individual installation technician to receive aural indications of signal strength while installing a radio.

SUMMARY

According to some embodiments, the present technology is directed to a method comprising: (a) receiving a signal strength corresponding to a long range wireless link established between a first directional wireless radio and a second wireless radio, the signal strength varying over time as the first directional wireless radio is aligned with a second wireless radio by an installer, wherein the signal strength is received over a short range wireless link from a short range wireless radio associated with the first directional wireless radio; and (b) producing a sound indicator indicative of the signal strength, wherein the sound indicator varies over time as the first directional wireless radio is aligned with the second wireless radio by the installer.

According to some embodiments, the present technology is directed to a method comprising: (a) executing an audible alignment application by a single installer using a mobile device, the audible alignment application being stored in memory and executable by a processor of the mobile device; and (b) aligning a first directional wireless radio with a second wireless radio by: (i) bringing the mobile device in proximity to the first directional wireless radio; (ii) receiving a signal strength corresponding to a long range wireless link established between the first directional wireless radio and the second wireless radio, the signal strength varying over time as the first directional wireless radio is aligned with a second wireless radio by the single installer; and (iii) producing a sound indicator indicative of the signal strength, wherein the sound indicator varies over time as the first directional wireless radio is aligned with the second wireless radio by the single installer.

According to some embodiments, the present technology is directed to a non-transitory computer readable storage media having a program embodied thereon, the program being executable by a processor to perform a method, comprising: (i) coupling a mobile device with a first directional wireless radio using a wireless communication protocol; (ii) receiving a signal strength corresponding to a long range wireless link established between a first directional wireless radio and a second wireless radio, the signal strength varying over time as the first directional wireless radio is aligned with a second wireless radio by an installer; and (iii) producing a sound indicator indicative of a comparison of the signal strength to an optimal signal strength value that aids in alignment of the first directional wireless radio and a second wireless radio According to some embodiments, the present technology is directed to a system, comprising: (a) a first directional wireless radio; and (b) a mobile device that is communicatively coupled with the first directional wireless radio, wherein the mobile device is configured to: (i) measure a location and signal strength of the first directional wireless radio relative to a second wireless radio, in a plurality of radio positions; (ii) determine an optimal radio position from the plurality of radio positions; and (iii) output a varying sound signal that aids an installer in bringing the first directional wireless radio into alignment with the second wireless radio, the varying sound signal based on a comparison of the signal strength to an optimal signal strength value.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
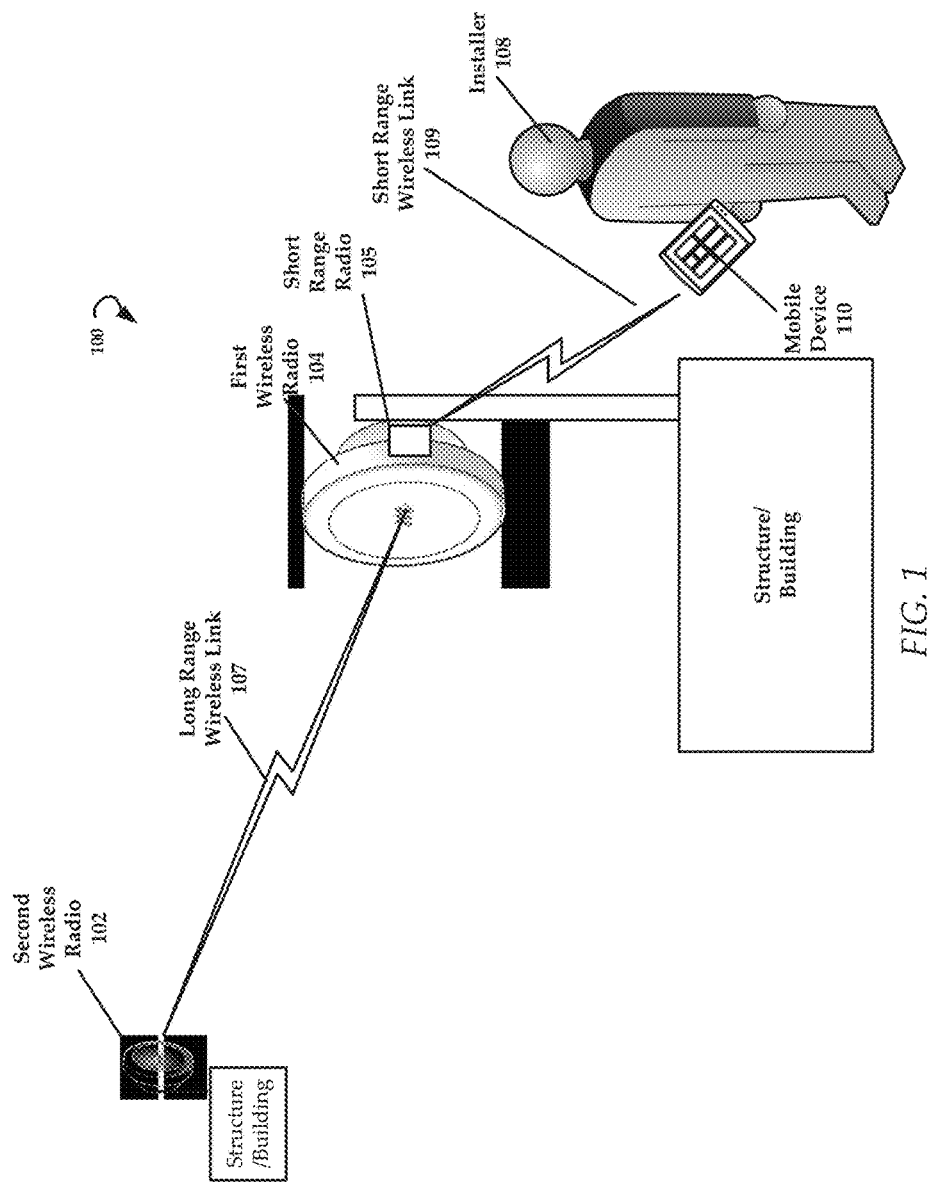
FIG. 1 is a block diagram of an exemplary system, constructed in accordance with embodiments of the present technology.

Wireless radios may have geometries that cause performance to vary with orientation. Microwave radios may be used to transmit broadband internet connections between fixed points, for instance between an Internet Service Provider (ISP) and a customer or group of customers. Microwave radios may therefore have fixed orientations having a significant impact on data throughput. The installation of radios may be a time-consuming operation that may have a consequently large impact on the cost of adopting a new ISP. Reducing the number of people required to install a radio, for instance from two people to one person, can have a dramatic impact on costs. A two person installation team may require one person to physically install/adjust the wireless radio, and a second person to monitor signal strength received at the radio and guide the physical installer in adjusting the elevation and azimuth of the radio.

Aligning a microwave radio for optimal signal strength can be challenging, particularly if an installer is working alone. Prior approaches have included LEDs indicators, either in a sequence, flashing at a rate to indicate signal strength, or as a seven-segment display. These methods may not provide the accuracy or visibility required by the installer. Another approach is using a computer to view the signal strength through a web browser, but this does not lend itself to a sole installer.

The present technology may utilize a smart phone connected to the radio, either by WiFi or other short range wireless link, such that the installer hears human speech, or another aural indication, to direct the alignment. By setting the smartphone for speakerphone operation, for example, the installer can put the phone into a pocket, leaving both hands free for radio alignment.

The Voice Guided Radio Alignment method and system provided herein may be integrated into a radio system to assist in installation, or the radio system may include a WiFi, Bluetooth or other secondary communication system for transmitting a signal strength of the signal being received at the radio being installed, such as a long range wireless link between a first radio and a second radio.

The WiFi, Bluetooth or other secondary communication system may couple the radio to a smartphone, laptop or personal digital assistant to produce an aural indication of strength. The aural indication of strength may be volume, for instance increasing volume as the signal strength increases. Alternatively, the aural indication may vary in tone to indicate strength, for instance rising (or alternatively, lowering) in tone as the signal strength increases. In still further alternatives, the aural indication may be a voice indicating an absolute strength of the signal, e.g., a number, or a relative strength of the signal, e.g. stronger or weaker. The aural indication may be made periodically, for instance every two seconds or five seconds (or in any other possible periodicity, or adjustably periodically), or may be made in response to a voice input made by the person installing the radio (e.g., "now?", "strength?", or "reading?).

For example, when an installer directs a radio to within approximately five degrees of alignment, a signal including an SSID may be received. Further alignment requires an indication of signal strength, which in prior art systems may include LEDs with gradations of 10 dBm. However, this system may be too granular and not very accurate, and consequently not as helpful to the installer. Additionally, the LEDs may be in a position that may not always be visible, for instance on a back side of a radio or radio housing. Alternative prior art systems may use two installers, with one installer physically moving and adjusting the radio, either in elevation or azimuth alternately, while a second installer uses a laptop to monitor an indication of signal strength received at the radio.

The present technology provides an application for a smartphone, for instance an iPhone or an Android phone, that provides a voice indication (or other aural indication) of signal strength. The aural indication of signal strength may be provided periodically or on demand in response to a voice input from the installer. The radio being installed may include a WiFi, Bluetooth, or other communication method for communicating a strength of the signal (for example, the microwave signal) being received to the smartphone.

In still further alternatives, the radio system may include an integrated automatic aural adjustment system, which may include, along with a system for measuring a strength of the microwave (or other incoming) signal, a speaker for producing sound, and a memory for storing sound indications, for instance speech or tones (e.g. a ".wav" file). The volume of the speaker may vary depending on the strength of the signal, alternatively or in addition to speech indications and/or tonal change indications.

Still further alternatives may use a smartphone or other internet-enabled device to access a mapping program (e.g., Google Maps™) to assist in initial alignment, and/or may record signal strength results during, or at the conclusion of, the installation process. The signal strength results may be recorded in the smartphone and/or transmitted to a central location for storage and/or analysis.

The aural adjustment system including the system for measuring a strength of the microwave (or other incoming) signal may be integrated into a management system and/or a management radio used to administer the remote radio system. The management of the radio system may be in a different band than the microwave (or other wavelength) primary signal carrier in order to avoid interference with the primary signal and/or with the management of the radio system.

In additional embodiments, the present technology can employ methods for determining an optimal signal strength value from a variety of radio alignment attributes. The optimal signal strength value is utilized to align a first wireless radio with a second wireless radio by bringing an actual signal strength into correspondence with the optimal signal strength value by making adjustments to the alignment of the first directional wireless radio and second wireless radio.

The application may be a mobile application, and/or may be used on a laptop, smartphone or PDA, and may be downloadable or web-based. Alternatively, the system may be implemented in software and/or hardware.

Referring now to FIG. 1, an environment for practicing aspects of the present technology is illustrated therein. The environment 100 comprises a second wireless radio 102 that is located remotely from a first directional wireless radio 104. The first directional wireless radio 104 can be disposed anywhere, such as on the outside of a structure or inside the structure.

An installer 108 can align the first directional wireless radio 104 with the second wireless radio 102 using a mobile device 110, such as a tablet, Smartphone, or other computing device that couples with the first directional wireless radio 104.

The second wireless radio 102 can include another radio, a MIMO (Multiple Input Multiple Output) radio, a satellite, a broadcast tower, a cellular network, a WiFi hotspot or access point, or any other device that is configured to transmit and/or receive a signal. The first directional wireless radio 104 can also comprise any device that is configured to transmit and/or receive signals from the second wireless radio 102.

The first directional wireless radio 104 and second wireless radio 102 are communicatively coupled over a long range wireless link 107. A signal strength of the long range wireless link 107 selectively varies as the first directional wireless radio 104 and second wireless radio 102 are brought into alignment with one another by an installer 108. To be sure, the present technology advantageously allows the installer 108 to receive signal strength information from the first directional wireless radio 104 in a hands-free manner. That is, once the installer 108 executes The App, the mobile device 110 begins to receive the signal strength from by communicating with the short range radio 105 over a short range wireless link 109.

The installer 108 receives aural indications of the signal strength and/or a relative alignment between the first directional wireless radio 104 and second wireless radio 102 without having to further interact with mobile device 110, which leaves the installer 108 free to adjust a position of the first directional wireless radio 104 with both hands while receiving alignment feedback on their mobile device 110.

In some embodiments, the first directional wireless radio 104 includes a radio and long range antenna that are integrated into a single housing or enclosure, along with the short range wireless radio 105. In other embodiments, the radio and long range antenna are not integrated into the same housing. The long range (e.g., high gain) antenna can still be integrated with the short range wireless radio 105, even in these embodiments where the radio is separate.

The second wireless radio 102 and first directional wireless radio 104 can communicate wirelessly when they are properly aligned with one another. To be sure, misalignment between the second wireless radio 102 and the first directional wireless radio 104 can result in signal degradation and poor connectivity there between.

In some embodiments, the mobile device 110 is communicatively coupled with the first directional wireless radio 104 using a short range wireless communications protocol such as Bluetooth, Infrared, Near Field Communications, or through a WiFi connection. In one embodiment, the first directional wireless radio 104 comprises or is coupled to a short range radio 105. The mobile device 110 communicates with the short range radio 105 over a short range wireless link 109.

In another example, the first directional wireless radio 104 may couple with a WiFi access point in the structure. The mobile device 110 can also couple with the WiFi access point and communicate with the first directional wireless radio 104 over the wireless network established by the WiFi access point.

The installer 108 can use the mobile device 110 to communicate with the first directional wireless radio 104 to receive signals from the radio that are indicative of a signal strength being received by the first directional wireless radio 104 from the second wireless radio 102. Again, the signal strength relates to the long range wireless link 107

Figure 2:
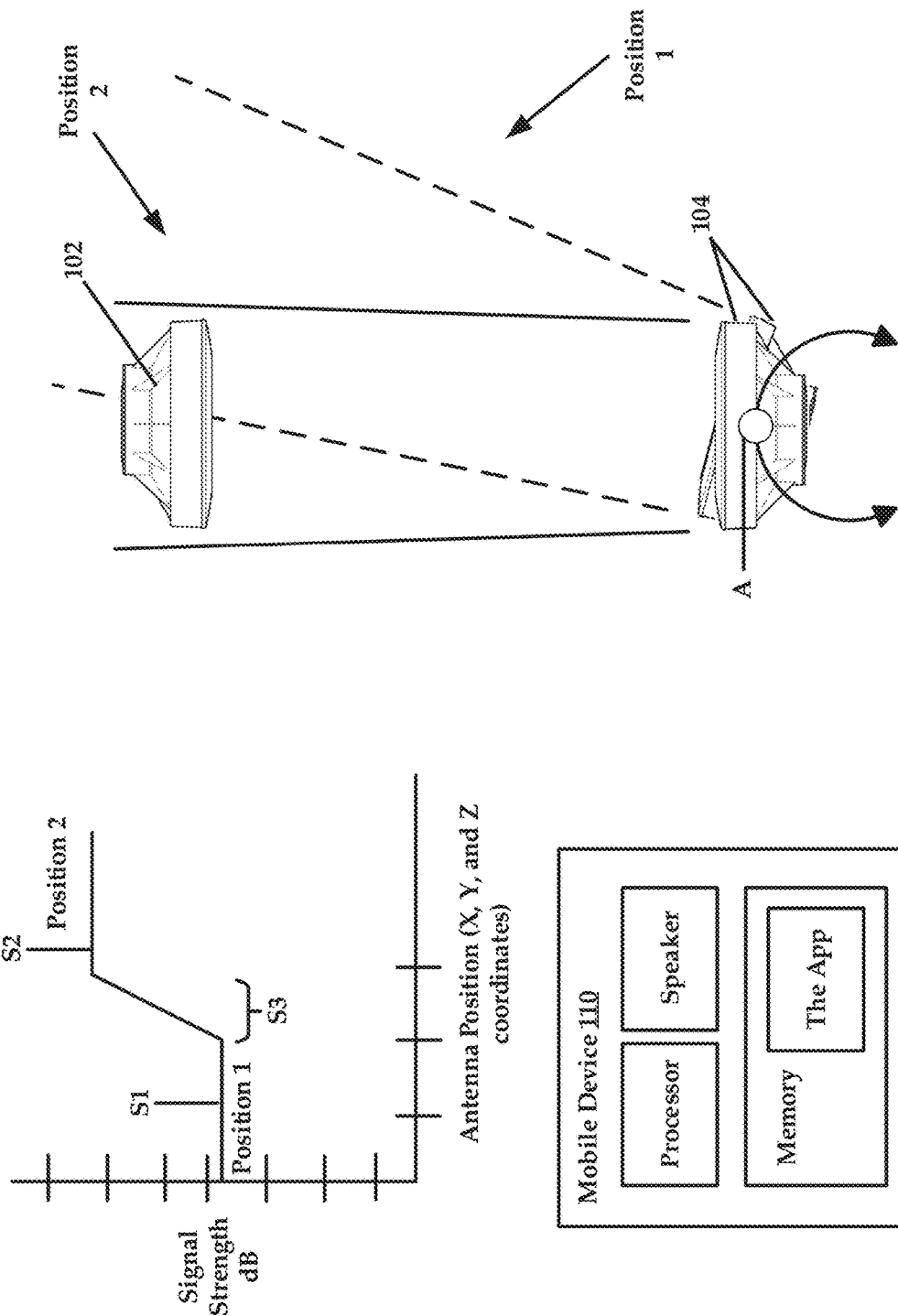
FIG. 2 illustrates an example radio alignment process and variable sound output graph.

The mobile device 110 comprises, in some embodiments, a processor and memory that are configured to store and execute instructions such as a radio alignment application ("The App"), as illustrated in FIG. 2.

FIG. 2 also illustrates an example radio alignment process. While the alignment process in FIG. 2 is illustrated as a two dimensional alignment process (e.g., a combination of X and Y coordinates changed through rotation of the first directional wireless radio 104 about a central point A), the first directional wireless radio 104 can be aligned in three dimensions such as X, Y, and Z. To be sure, the Z axis would include vertical movement along the central point A.

The first directional wireless radio 104 is illustrated as being in Position 1 originally, where a broadcast pattern B1 of the first directional wireless radio 104 is only partially aligned with the second wireless radio 102. When the first directional wireless radio 104 is in Position 1, initial signal strength S1 is received by the mobile device 110. The initial signal strength S1 can be output by a speaker of the mobile device 110 as, for example, a tone having a variable frequency, a pulse tone that varies in pulse rate, a speech synthesized output that is representative of the initial signal strength such as "−20 dBm", as well as other variable audio output by the speaker. In some embodiments, the mobile device 110 can also vibrate to indicate signal strength.

When the installer 108 rotates the first directional wireless radio 104 to the left, about the central point A, the first directional wireless radio 104 is rotated into Position 2. As the first directional wireless radio 104 is rotated, the signal strength changes as the first directional wireless radio 104 rotates between Position 1 and Position 2.

Because Position 2 is in greater alignment with the second wireless radio 102, a signal strength S2 output by the radio is greater in decibels than the signal strength at Position 1.

To be sure, while the sound output by the mobile device 110 at Position 1 is different from the sound output by the mobile device 110 at Position 2, the sound output will vary between Position 1 and Position 2, as the first directional wireless radio 104 is moved. For example, in section S3, the signal strength changes from −20 dBm to −40 dBm.

An example of varying output by the mobile device 110 would include a tone having a first frequency being output by the mobile device 110 in response to signal strength S1. Next, the tone would increase in frequency between the first frequency and a final frequency as the radio is transitioned from Position 1 to Position 2. That is, the tone of output by the mobile device 110 steadily changes until reaching a final frequency associated with the signal strength S2.

For example, the signal strength region S3 has a varying signal strength, which causes the mobile device 110 to generate an output of varying intensity.

Again, the example, above describes the use of varying tone frequencies in response to varying signal strength, it will be understood that the mobile device 110 can be configured (through The App) to output varying pulses of a single tone frequency or varying speech output.

In some embodiments, the mobile device 110 is configured through The App to calculate or approximate the optimal signal strength value. For example, when installing and aligning a radio with a second wireless radio, the installer may not know what the optimal signal strength value should be. Advantageously, the optimal signal strength value can be calculated using a plurality of signal strength determination attributes.

In one embodiment, the mobile device 110 is configured to determine a GPS location of the directional first wireless radio 104. The mobile device 110 can look up a location for the second wireless radio 102 from a database. Knowing the distance, the mobile device 110 can calculate an approximate optimal signal strength value. When the first directional wireless radio 104 and second wireless radio 102 are aligned properly at the determined distance, the actual or measured signal strength at the first directional wireless radio 104 should equal the optimal signal strength value.

The distance between the first directional wireless radio 104 and the second wireless radio 102 can be correlated to a free space path loss value, which is a loss in signal strength of an electromagnetic wave that would result from a line-of-sight path through free space.

Additional signal strength determination attributes comprise a conductive transmit power level, a transmit radio (e.g., antenna) gain, a receive radio (e.g., antenna) gain, as well as the free space path loss. In one embodiment, the optimal signal strength value is calculated as a logarithmic of the conductive transmit power level, plus the transmit radio gain, minus free space path loss, plus receive radio gain.

In some embodiments, the optimal signal strength value can be refined by using additional signal strength determination attributes. For example, atmospheric attenuation can be utilized as another signal strength determination attribute. To be sure, attenuating values are negative values in the logarithmic equation set forth above.

In some embodiments, the signal strength determination attributes can also comprise estimated obstructive losses/ attenuation caused by line-of-sight obstacles such as trees, brush, buildings, and so forth. In yet other embodiments, the signal strength determination attributes can also comprise losses from cables or other hardware associated with the first directional wireless radio 104.

According to some embodiments, if the mobile device 110 has access to, for example, Google Earth™ data, in addition to the information from the two linked radios (e.g., first directional wireless radio and the second wireless radio), including their locations, the mobile device 110 can determine if there is vegetative loss through trees that will impact the optimal signal strength value.

If the mobile device 110 has access to current weather data, such as the current rate of precipitation, in addition to the information from the two linked radios, (e.g., first directional wireless radio and the second wireless radio) including their frequency band, the mobile device 110 can determine the rain fade that will impact the target signal strength.

In some embodiments, the mobile device 110 is configured to output the optimal signal strength value at the beginning of an alignment procedure. For example, when the mobile device 110 and first directional wireless radio 104 are communicatively coupled, the mobile device 110 may be configured to output the optimal signal strength value in speech form to inform the installer of the optimal signal strength value that is required for proper alignment. The installer need only adjust the position of the first directional wireless radio 104 as the mobile device 110 outputs the actual signal strength as variable sound output. When the actual signal strength matches the optimal signal strength value, the first directional wireless radio 104 and second wireless radio 102 are aligned.

During the alignment process, the installer can utilize the mobile device 110 to output the optimal signal strength value if the installer does not recall the optimal signal strength value.

While the above descriptions contemplate optimal signal strength values being calculated and utilized by the mobile device 110, it will be understood that these processes involving the optimal signal strength values can be calculated in a cloud-based environment and provided to the mobile device 110 through The App.

Figure 3:
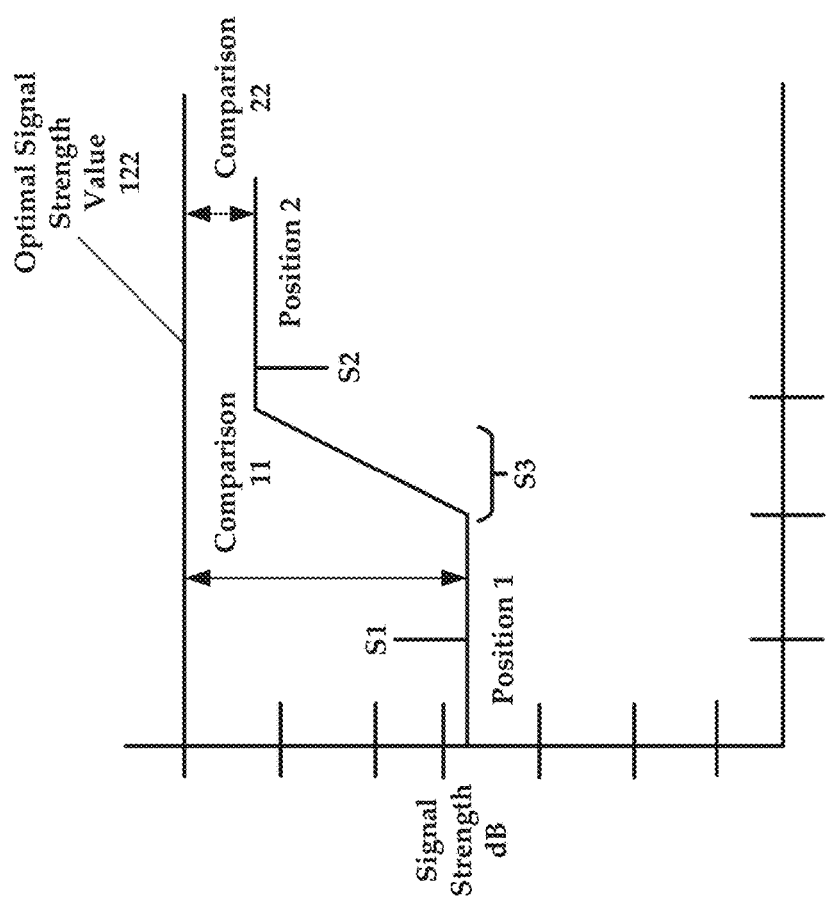
FIG. 3 is a graph that illustrates the use of an optimal signal strength value to assist an installer in radio alignment.

Referring now to FIG. 3, in some embodiments, the mobile device 110 can be configured to utilize an optimal signal strength value 122 for outputting one or more additional tones. The mobile device 110 can perform comparisons between the optimal signal strength value 122 and the actual signal strength being measured at the first directional wireless radio 104 and use this measured comparison to output information to the installer 108 (see FIG. 1).

In one embodiment, the optimal signal strength value 122 is −60 dBm. The mobile device 110 measures the signal strength S1 of −20 dBm and generates a Comparison 11 having a value of −40 dBm. When the first directional wireless radio 104 is rotated and the signal strength S2 is measured of −58 dBm, the mobile device 110 generates a Comparison 22 having a value of −2 dBm. Using this comparison, the mobile device 110 can output a third type of variable output that represents the comparison value. This variable output can be used in place of, or in addition to, the variable outputs described above. For example, the mobile device 110 can use natural language speech output to call out the comparison values. The installer 108 hears the comparison values and can appreciate that the first directional wireless radio 104 is in substantial alignment with the second wireless radio 102 when the −2 dBm comparison value is output. That is, it is assumed that the −2 dBm comparison value indicates that the first directional wireless radio 104 and second wireless radio 102 are in optimal (or close to) alignment.

In some embodiments, the mobile device 110 can set a tone frequency for the optimal signal strength value 122. In one example, the mobile device 110 can assign to the optimal signal strength value 122 a tone of C. Any signal strength of the first directional wireless radio 104 that is measured below the optimal signal strength value 122 causes the mobile device 110 to output a tone that is lower than C (where C is located on a musical scale between A-G). The mobile device 110 can output this tone consistently through a sample alignment process.

In one example, the mobile device 110 can output another tone in addition to the constant tone assigned to the optimal signal strength value 122. This tone is variable and corresponds to the actual measured signal strength for the first directional wireless radio 104.

In one embodiment, the mobile device 110 can set an initial tone for signal strength S1 at A. As the measured signal strength of the first directional wireless radio 104 increases towards the optimal signal strength value 122, the tone will increase in frequency from A towards C. Once the measured signal strength of the first directional wireless radio 104 and the optimal signal strength value 122 converge, the installer 108 will hear a single tone of C, which will indicate that the first directional wireless radio 104 and second wireless radio 102 are in alignment with one another.

In some embodiments, the constant tone can be continuous or can be output intermittently by the mobile device 110.

In another embodiment, the mobile device 110 can use the comparison to direct the installer 108 to move the first directional wireless radio 104 in a particular direction. For example, if the installer 108 is moving the first directional wireless radio 104 in a sweeping motion to obtain a general alignment, the mobile device 110 can be configured through The App to detect a position of the first directional wireless radio 104 relative to the central position A, using for example, an accelerometer or other movement sensing device that is built into the mobile device 110 or installed into the first directional wireless radio 104. For example, the installer 108 can place their mobile device 110 directly on the first directional wireless radio 104 to sense movement of the first directional wireless radio 104.

If the first directional wireless radio 104 is being moved in a sweeping pattern, for example, the mobile device 110 can detect signal strength and location at the same time across various locations during the sweeping procedure. That is, for each signal strength taken, a location for the first directional wireless radio 104 is determined and stored.

The mobile device 110 can determine that the installer 108 should move the first directional wireless radio 104 in one direction or another (or potentially multiple directions when moving the first directional wireless radio 104 in the X, Y and Z axes) based upon the best or highest signal detected during the sweeping procedure. In another example, the mobile device 110 can determine that the installer 108 should move the first directional wireless radio 104 in one direction or another based upon comparison values, as well.

Also, a sweeping procedure can be used, as well as the obtaining of multiple signal values at various points to detect a general alignment area where signal strength is increasing.

In one embodiment, the mobile device 110 can detect the highest signal strength for the first directional wireless radio 104 at a plurality of locations (a set of X, Y, and Z), detect a current position of the first directional wireless radio 104, and guide the installer 108 to optimal alignment through verbal output, such as speech information that tells the installer 108 to move the radio up/down, left/right, rotate, and so forth.

Figure 4:
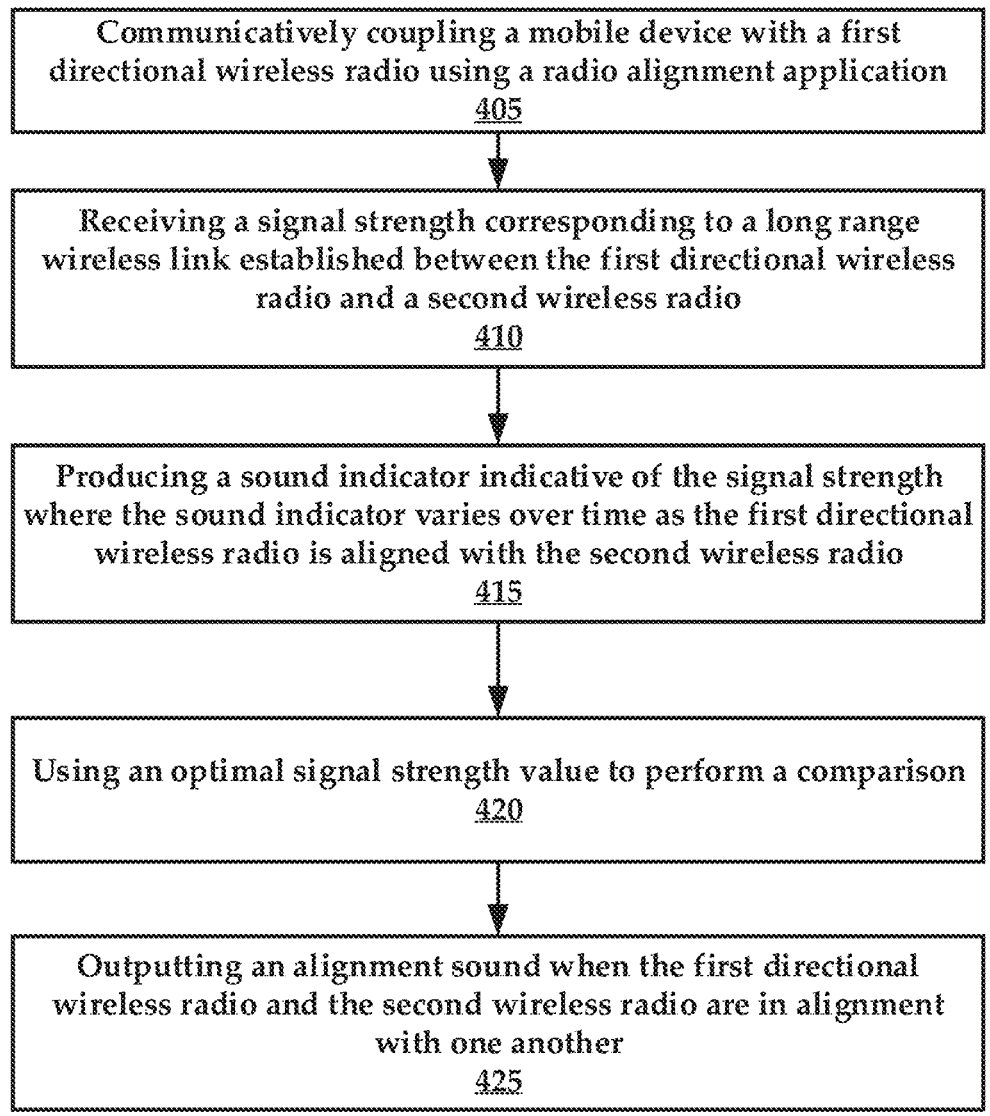
FIG. 4 is a flowchart of an example method of the present technology.

FIG. 4 illustrates an example method of the present technology. The method begins with the installer communicatively coupling 405 a mobile device with a first directional wireless radio using a radio alignment application. In some embodiments, the mobile device can couple with the first directional wireless radio by bringing the mobile device into proximity with the first directional wireless radio.

The alignment application configures for measurement of radio signal strength using whichever of the methods the installer desires to utilize. In this method, the installer selects to have a varying sound indicator output by the mobile device.

The method includes receiving 410 a signal strength corresponding to a long range wireless link established between the first directional wireless radio and a second wireless radio.

To be sure, the signal strength varies over time as the first directional wireless radio is aligned with a second wireless radio by an installer. To be sure, the signal strength corresponds to a long range wireless link established between the first directional wireless radio and the second wireless radio.

In some embodiments, the signal strength will vary over time as the radio is aligned with a second wireless radio by the installer. Thus, the method includes the mobile device producing 415 a sound indicator indicative of the signal strength. Again, the sound indicator varies over time as the first directional wireless radio is aligned with the second wireless radio.

As mentioned above, the varying sound indicator can include a pulsing tone of a given frequency, where the pulse rate increases or decreases in response to the increase or decrease in signal strength. In another embodiment, the varying sound indicator can include a tone of varying frequency or a speech output of varying content, such as a natural language output that includes a verbalized representation of the signal strength compared with an optimal signal strength value.

In one embodiment, the method can include sub-method of using 420 an optimal signal strength value to perform a comparison. To be sure, steps 405-415 can be performed independently of steps 420 and 425. For example, the optimal signal strength value can be compared to the signal strength to determine a degree of misalignment between the first directional wireless radio and the second wireless radio.

When the an optimal signal strength value and the signal strength are substantially equal to one another, the method includes outputting 425 an alignment sound when the first directional wireless radio and the second wireless radio are in alignment with one another. For example, the alignment sound could include a single tone of a given frequency (which is different from other tones used in the comparison process). The alignment sound could include a spoken word of "aligned".

Figure 5:
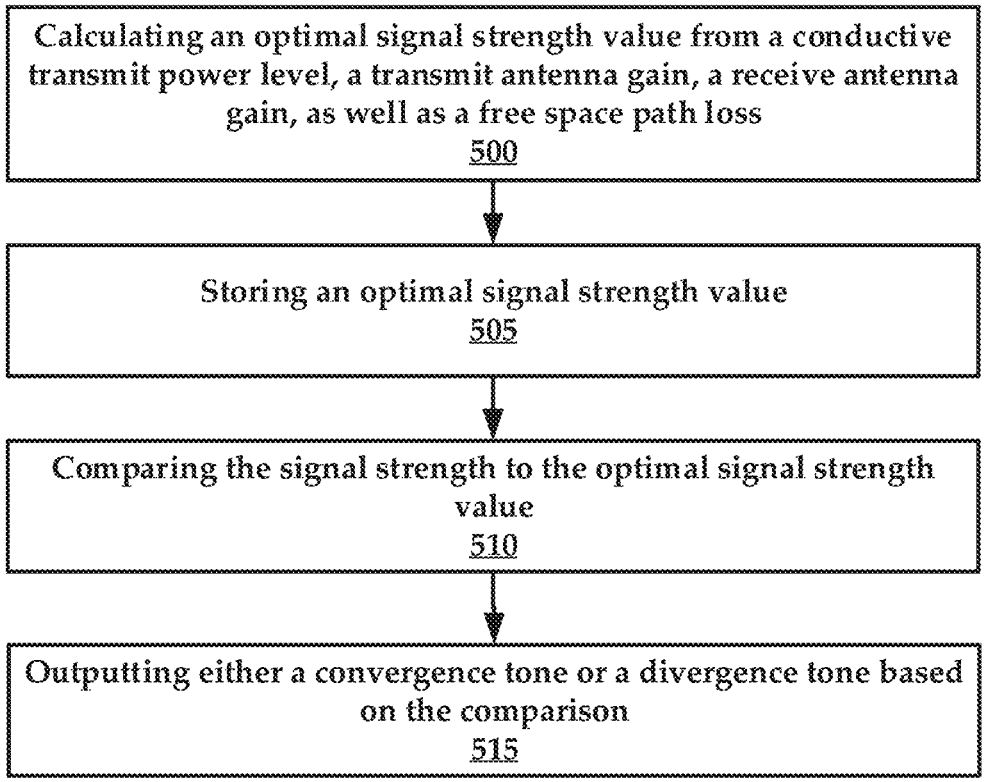
FIG. 5 is a flowchart of another example method of the present technology.

FIG. 5 illustrates an example, sub-method for using an optimal signal strength value during the alignment process. In some embodiments, the method comprises a step of calculating 500 an optimal signal strength value from a conductive transmit power level, a transmit radio gain, a receive radio gain, as well as a free space path loss.

This method includes storing 505 an optimal signal strength value. The optimal signal strength value comprises an expected signal strength when the first directional wireless radio and the second wireless radio are substantially in optimal alignment with one another.

Next, the method includes comparing 510 the signal strength to the optimal signal strength value.

The method includes the mobile device outputting 515 either a convergence tone or a divergence tone based on the comparison. The convergence tone is utilized when a difference between the signal strength and the optimal signal strength value is decreasing. For example, the mobile device detects the signal strength of alignment as the first directional wireless radio is moved by the installer.

If the mobile device determines that the signal strength and the optimal signal strength value are coming closer to one another, the mobile device can output a convergence tone. This convergence tone could include a particular note selected from a musical scale or a chord selected from a musical scale.

Conversely, a divergence tone is utilized when a difference between the signal strength and the optimal signal strength value is increasing, such as in instances where the first directional wireless radio and second wireless radio are moving further out of alignment with one another. This convergence tone could include a particular note selected from a musical scale or a chord selected from a musical scale that is different from the one selected for the convergence tone.

Figure 6:
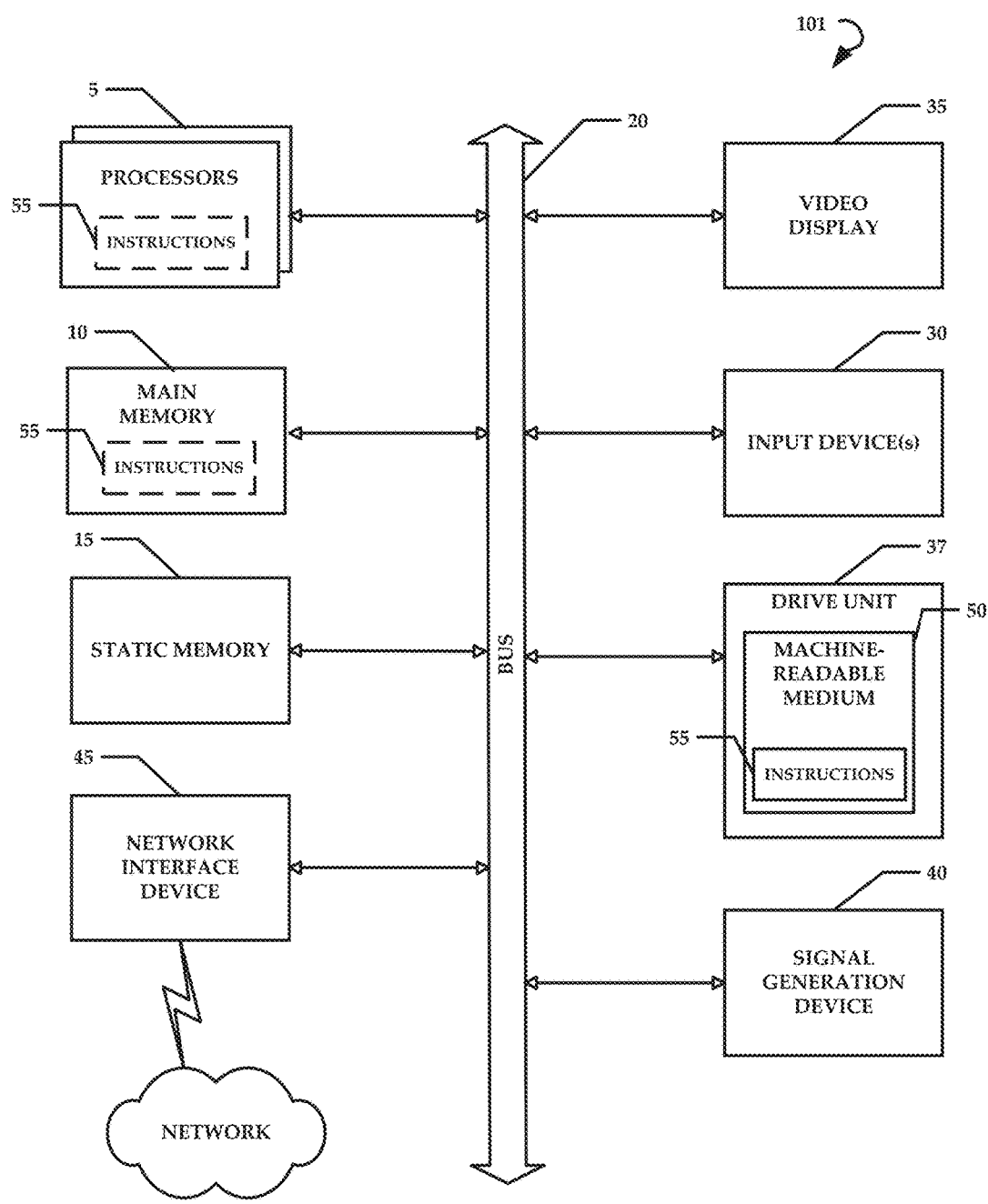
FIG. 6 illustrates an exemplary computing system that may be used to implement embodiments according to the present technology.

FIG. 6 is a diagrammatic representation of an example machine in the form of a computer system 101, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 101 includes a processor or multiple processors 5 (e.g., a central processing unit (CPU), a graphics processing unit (GPU), or both), and a main memory 10 and static memory 15, which communicate with each other via a bus 20. The computer system 101 may further include a video display 35 (e.g., a liquid crystal display (LCD)). The computer system 101 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 101 may further include a data encryption module (not shown) to encrypt data.

The disk drive unit 37 includes a computer or machine-readable medium 50 on which is stored one or more sets of instructions and data structures (e.g., instructions 55)

embodying or utilizing any one or more of the methodologies or functions described herein. The instructions 55 may also reside, completely or at least partially, within the main memory 10 and/or within the processors 5 during execution thereof by the computer system 101. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 101 are required and thus portions of the computer system 101 can be removed if not needed, such as I/O devices.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    receiving, by a mobile device, a signal strength corresponding to a long range wireless link established between a first directional wireless radio and a second wireless radio, the signal strength varying over time as the first directional wireless radio is aligned with the second wireless radio by an installer, wherein the signal strength is received by the mobile device over a short range wireless link from a short range wireless radio associated with the first directional wireless radio;
    producing, by the mobile device, a sound indicator indicative of the signal strength, wherein the sound indicator varies over time as the first directional wireless radio is aligned with the second wireless radio by the installer, further wherein the sound indicator is a tone that varies in frequency; and
    outputting a constant tone at a frequency while at a same time outputting the sound indicator, the constant tone representing an optimal signal strength, the constant tone and the tone converging at the same frequency when the first directional wireless radio is aligned with the second wireless radio.

2. The method according to claim 1, wherein the varying sound indicator comprises a tone with variable volume.

3. The method according to claim 1, wherein the varying sound indicator comprises a tone with variable frequency.

4. The method according to claim 1, wherein the varying sound indicator comprises a natural language output that includes a verbalized representation of the signal strength compared with an optimal signal strength value.

5. The method according to claim 1, further comprising:
    storing an optimal signal strength value, wherein the optimal signal strength value comprises an expected signal strength when the first directional wireless radio and the second wireless radio are substantially in optimal alignment with one another;
    comparing the optimal signal strength value to the signal strength; and
    outputting either a convergence tone or a divergence tone based on the comparison, wherein the convergence tone is utilized when a difference between the optimal signal strength value and the signal strength is decreasing, further wherein the divergence tone is utilized when a difference between the optimal signal strength value and the signal strength is increasing.

6. The method according to claim 1, wherein the varying sound indicator comprises an alignment sound when the first directional wireless radio and the second wireless radio are in alignment with one another.

7. A method, comprising:
executing an audible alignment application by a single installer using a mobile device, the audible alignment application being stored in memory and executable by a processor of the mobile device; and
aligning a first directional wireless radio with a second wireless radio by:
bringing the mobile device in proximity to the first directional wireless radio;
receiving a signal strength corresponding to a long range wireless link established between the first directional wireless radio and the second wireless radio, the signal strength varying over time as the first directional wireless radio is aligned with the second wireless radio by the single installer; and
producing a sound indicator indicative of the signal strength, wherein the sound indicator varies over time as the first directional wireless radio is aligned with the second wireless radio by the single installer, further wherein the sound indicator is a tone that varies in frequency, and the method further comprises outputting a constant tone at a frequency while at a same time outputting the sound indicator, the constant tone representing an optimal signal strength, the constant tone and the tone converging at the same frequency when the first directional wireless radio is aligned with the second wireless radio.

8. The method according to claim 7, wherein the varying sound indicator comprises a tone with variable volume.

9. The method according to claim 8, wherein the varying sound indicator comprises a natural language output that includes a verbalized representation of the signal strength compared with an optimal signal strength value.

10. The method according to claim 8, further comprising:
storing an optimal signal strength value, wherein the optimal signal strength value comprises an expected signal strength when the first directional wireless radio and the second wireless radio are substantially in optimal alignment with one another; and
outputting the optimal signal strength value prior to, or in combination with, receiving the signal strength to aid the single installer in knowing the optimal signal strength value.

11. The method according to claim 10, further comprising calculating the optimal signal strength value using a conductive transmit power level, a transmit radio gain, a receive radio gain, as well as a free space path loss between the first directional wireless radio and the second wireless radio.

12. The method according to claim 11, further comprising refining the optimal signal strength value using any of atmospheric attenuation, cable losses, and line-of-sight obstacle attenuation.

13. The method according to claim 10, wherein the varying sound indicator comprises an alignment sound when the first directional wireless radio and the second wireless radio are in alignment with one another.

14. The method according to claim 7, wherein the varying sound indicator comprises a tone with variable frequency.

15. A non-transitory computer readable storage media having a program embodied thereon, the program being executable by a processor to perform a method, comprising:
coupling a mobile device with a first directional wireless radio using a wireless communication protocol;
receiving a signal strength corresponding to a long range wireless link established between the first directional wireless radio and a second wireless radio, the signal strength varying over time as the first directional wireless radio is aligned with the second wireless radio by an installer;
producing a sound indicator indicative of a comparison of the signal strength to an optimal signal strength value that aids in alignment of the first directional wireless radio and the second wireless radio, further wherein the sound indicator is a tone that varies in frequency; and
outputting a constant tone at a frequency while at a same time outputting the sound indicator, the constant tone representing an optimal signal strength, the constant tone and the tone converging at the same frequency when the first directional wireless radio is aligned with the second wireless radio.

16. The non-transitory computer readable storage media according to claim 15, wherein the method further comprises receiving a spoken request from a single installer, the spoken request comprising a request for a signal strength reading, wherein the varying sound indicator is output after the spoken request is received.

17. The non-transitory computer readable storage media according to claim 15, wherein the method further comprises storing values for the signal strength in a log for further analysis.

18. The non-transitory computer readable storage media according to claim 15, wherein the method further comprises receiving the signal strength on a band that is different than a primary band used for transmitting a primary signal carrier.

19. A system, comprising:
a first directional wireless radio; and
a mobile device that is communicatively coupled with the first directional wireless radio, wherein the mobile device is configured to:
measure a location and signal strength of the first directional wireless radio relative to a second wireless radio, in a plurality of radio positions;
determine an optimal radio position from the plurality of radio positions;
output a varying sound signal that aids an installer in bringing the first directional wireless radio into alignment with the second wireless radio, the varying sound signal based on a comparison of the signal strength to an optimal signal strength value, further wherein the varying sound signal is a tone that varies in frequency; and
output a constant tone at a frequency while at a same time outputting the varying sound signal, the constant tone representing an optimal signal strength, the constant tone and the tone converging at the same frequency when the first directional wireless radio is aligned with the second wireless radio.

20. The system according to claim 19, further comprising a short range wireless antenna that communicatively couples the mobile device with the first directional wireless radio over a short range wireless link.

* * * * *